United States Patent
Lu

(10) Patent No.: US 8,844,646 B2
(45) Date of Patent: Sep. 30, 2014

(54) INTEGRATED CYLINDER AND REVERSING ASSEMBLY OF A RECIPROCATING PNEUMATIC TOOL

(75) Inventor: Kuo-Jung Lu, Taichung (TW)

(73) Assignee: Sing Hua Industrial Co., Ltd., Taichung (TW)

( * ) Notice: Subject to any disclaimer, the term of this patent is extended or adjusted under 35 U.S.C. 154(b) by 399 days.

(21) Appl. No.: 13/299,892

(22) Filed: Nov. 18, 2011

(65) Prior Publication Data

US 2013/0126200 A1     May 23, 2013

(51) Int. Cl.
    *B23B 45/04*     (2006.01)
    *B23D 51/18*     (2006.01)
    *B25D 17/24*     (2006.01)

(52) U.S. Cl.
    CPC ............... *B23D 51/18* (2013.01); *B25D 17/24* (2013.01)
    USPC ........................................ 173/169; 173/114

(58) Field of Classification Search
    CPC .......... B25F 5/00; B23D 51/18; B25D 17/24; B25D 9/08; B25D 2250/035; B25D 2209/005
    USPC ............ 173/221, 218, 90–91, 104, 168–170, 173/114; 30/392; 91/232, 233, 234
    See application file for complete search history.

(56) References Cited

U.S. PATENT DOCUMENTS

| | | | | |
|---|---|---|---|---|
| 5,992,539 A | * | 11/1999 | Lin ................................. | 173/93 |
| 6,158,528 A | * | 12/2000 | Izumisawa .................... | 173/168 |
| 6,655,033 B2 | * | 12/2003 | Herrmann et al. .............. | 30/276 |
| 6,695,072 B2 | * | 2/2004 | Izumisawa .................... | 173/168 |
| 6,932,165 B1 | * | 8/2005 | Sun et al. ...................... | 173/169 |
| 7,080,578 B2 | * | 7/2006 | Izumisawa .................... | 81/57.39 |
| 7,137,763 B2 | * | 11/2006 | Lawson ........................ | 409/140 |
| 7,396,197 B2 | * | 7/2008 | Lawson ........................ | 409/131 |
| 7,753,136 B2 | * | 7/2010 | Lu ................................. | 173/168 |
| 7,958,945 B2 | * | 6/2011 | Lu ................................. | 173/93.5 |
| 8,333,253 B2 | * | 12/2012 | Radif et al. ................... | 173/218 |
| 2009/0065231 A1 | * | 3/2009 | Lu ................................. | 173/211 |
| 2012/0048583 A1 | * | 3/2012 | Chang .......................... | 173/169 |
| 2013/0037292 A1 | * | 2/2013 | Chiu ............................. | 173/169 |

FOREIGN PATENT DOCUMENTS

TW        200911478 A      3/2009

* cited by examiner

*Primary Examiner* — Thanh Truong
*Assistant Examiner* — Eduardo R Ferrero
(74) *Attorney, Agent, or Firm* — Egbert Law Offices, PLLC

(57) ABSTRACT

An integrated module of a cylinder and reversing assembly of a reciprocating pneumatic tool is arranged between an air pressure control module and a guide outlet of a piston rod in a groove of the reciprocating pneumatic tool. The integrated module has a cylindrical body, an air pressure guiding seat positioned in the cylindrical body, a reversible actuating slot recessed into the seat body, a reversing brake block movably positioned into the reversible actuating slot, and a partition board fixedly assembled between the seat body and the cylindrical body.

6 Claims, 10 Drawing Sheets

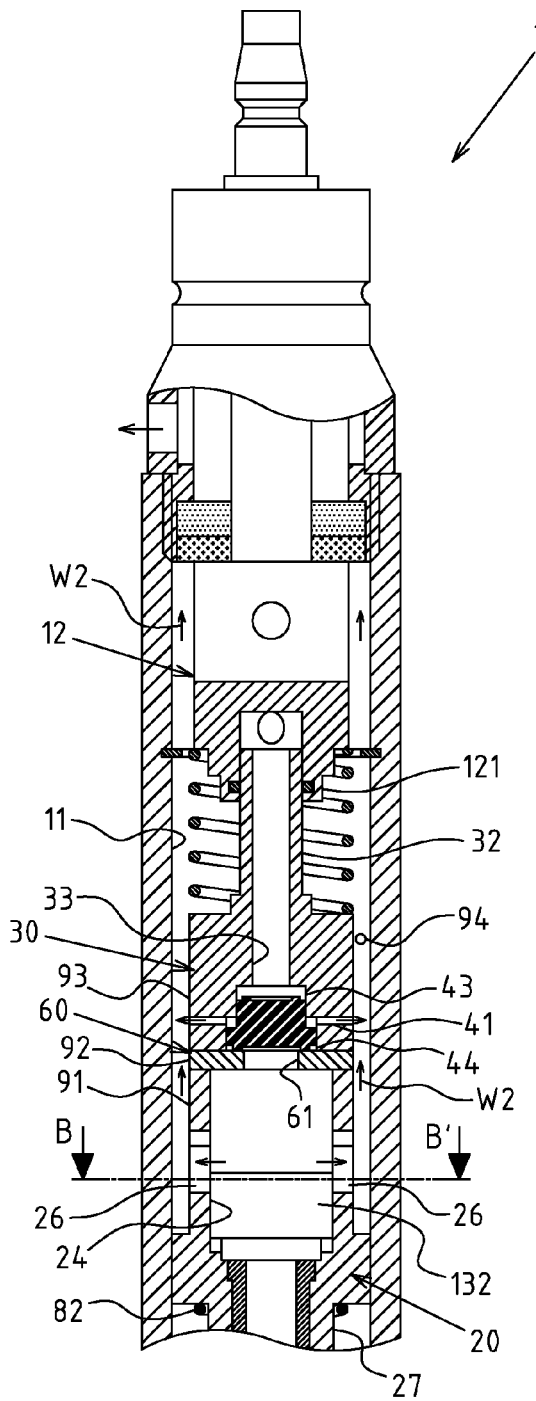
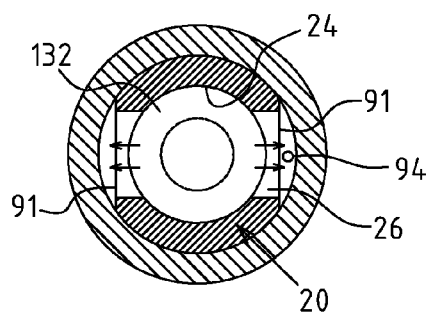
FIG.9
FIG.10

US 8,844,646 B2

INTEGRATED CYLINDER AND REVERSING ASSEMBLY OF A RECIPROCATING PNEUMATIC TOOL

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a reciprocating pneumatic tool, and more particularly to an innovative one which is designed with an integrated module of a cylinder and flow reversing assembly.

2. Description of Related Art Including Information Disclosed Under 37 CFR 1.97 and 37 CFR 1.98.

Reciprocating pneumatic tools such as pneumatic saws, pneumatic hammers and pneumatic cutters, are available with different functions depending on the shapes of the ends.

According to the operating principle of reciprocating pneumatic tools, the source of air is firstly guided into the tool, then the opening/closing of air pressure is controlled by a control valve, and an actuating module is used for automatic reversing of air pressure, enabling the reciprocating movement of a piston rod together with the ends of tools (e.g.: saw blade, punch hammer).

In view of the structural design of the reciprocating pneumatic tool, the number of components affects directly the cost and efficiency of fabrication, processing and assembly, and the defective fabrication and assembly increase with the growing number of components. Thus, due attentions must be paid to the technical issue of minimizing the structural members in the process of R&D and design.

As for the structural design of a conventional reciprocating pneumatic tool similar to the present invention, Taiwan patent claim No. 96133970: "A Reciprocating Pneumatic Tool" can be referenced, and the general configuration and pattern are shown therein. The flow reversing assembly of the prior art is structurally composed of a top plate, a principal pedestal and a base plate. The flow reversing assembly is superposed onto the surface of a cylinder. It is found from actual applications that the flow reversing assembly of the prior art must be provided with several overlapped plates, and then superposed onto a cylinder. Such an overlapping structure brings about much increase of fabrication, processing and assembly cost of structural members as well as poorer efficiency, meanwhile a higher defect may occur against the performance and quality of finished products. Furthermore, in order to realize accurate fitness and high air-tightness of unit components, the assembly surface of every unit component will be subject to time-consuming and costly precise processing, leading to higher fabrication cost with poorer industrial and economic benefits.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

The present invention allows the reversible actuating slot to be recessed integrally onto the air pressure guiding seat. Moreover, the air pressure guiding seat is separated from the cylinder body via said partition board. With this unique structural design as compared with the prior art, the partition board, air pressure guiding seat's assembly end surface and cylinder body's inner assembly end can be grinded precisely to realize accurate fitness of various components. Of which the partition board of a planar sheet permits very easy and precise grinding, so the integrated module of cylinder and flow reversing assembly enables to simplify the processing and mass production, reduce the fabrication/processing cost, shorten the assembly time and minimize the defect with better applicability and industrial benefits.

Although the invention has been explained in relation to its preferred embodiment, it is to be understood that many other possible modifications and variations can be made without departing from the spirit and scope of the invention as hereinafter claimed.

BRIEF DESCRIPTION OF THE SEVERAL VIEWS OF THE DRAWINGS

FIG. 9 is an exhaust schematic view of the present invention.

FIG. 10 is a B-B' sectional view of FIG. 9.

DETAILED DESCRIPTION OF THE INVENTION

Figure 1:
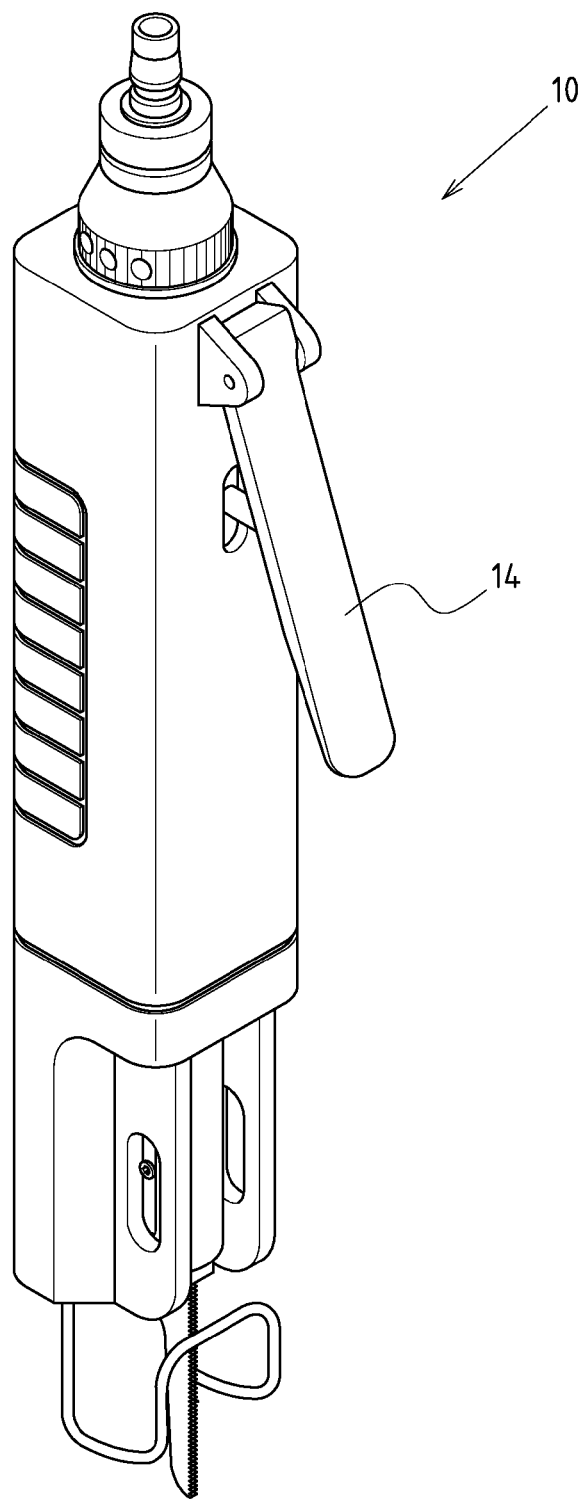
FIG. 1 is an assembled perspective external view of the reciprocating pneumatic tool of the present invention.

FIGS. 1-5 depict preferred embodiments of an integrated module of cylinder and reversing assembly of a reciprocating pneumatic tool of the present invention, which, however, are provided for only explanatory objective for patent claims. Said integrated module A of cylinder and reversing assembly is arranged between an air supply end 121 of air pressure control module 12 and a guide outlet 131 of piston rod 13 in the groove 11 of reciprocating pneumatic tool 10 (marked in FIG. 4). The piston rod 13 is provided with a piston 132 and a tool assembly portion 133.

The integrated module A of cylinder and reversing assembly comprises a cylinder body 20, a hollow body shaping an inner assembly end 21, an external end 22, a cylinder wall 23 and a chamber 24. Of which, the chamber 24 is used for accommodating the piston 132 of the piston rod 13. Several air flow ducts 25 are set internally and extended along the cylinder wall 23. Moreover, air vents 26 are opened laterally onto two opposite sides of the cylinder wall 23. A reducing piston rod guiding tube 27 is protruded on the external end 22.

An air pressure guiding seat 30 has a seat body 31 and an air inlet end 32. A main air inlet guide hole 33 is penetrated into air inlet end 32 is connected with an air supply end 121 of the air pressure control module 12. The seat body 31 is provided with an assembly end surface 34, and flow ducts 35 are set onto two opposite sides of the assembly end surface 34. Said flow duct 35 is connected obliquely with the main air inlet guide hole 33 via the secondary air inlet guide hole 36.

A reversible actuating slot 40 is recessed into the assembly end surface 34 of the seat body 31, with its inner end connected with the main air inlet guide hole 33. A lateral through-hole 41 set on the reversible actuating slot 40 runs through the side wall of the seat body 31. Oblique through-holes 42 set on two sides of the inner wall of the reversible actuating slot 40 run through the assembly end surface 34 of the seat body 31. Two sides of the reversible actuating slot 40 are connected with the flow duct 35 on the assembly end surface 34.

A reversing brake block 50 is accommodated movably into the reversible actuating slot 40, and reducing flange 51 is formed onto one end of the reversing brake block 50 correspondingly to the reversible actuating slot 40 (shown in FIGS. 3, 5), so as to increase the lateral area pushed by air pressure; the lateral through-hole 41 on the reversible actuating slot 40 could maintain smooth lifting of the reversing brake block 50 by releasing air accumulated in the reversible actuating slot 40.

A partition board 60 is assembled fixedly between the assembly end surface 34 on the seat body 31 of the air pressure guiding seat 30 and the inner assembly end 21 of the cylinder body 20. A through-hole 61 of a diameter smaller than external diameter of the reversing brake block 50 is set on the center of the partition board 60. Two flow troughs 62 spaced onto the partition board 60 are connected with the air flow duct 25 on the cylinder wall 23 of the cylinder body 20 and the oblique through-hole 42 on the seat body 31 of the air pressure guiding seat 30.

Figure 3:
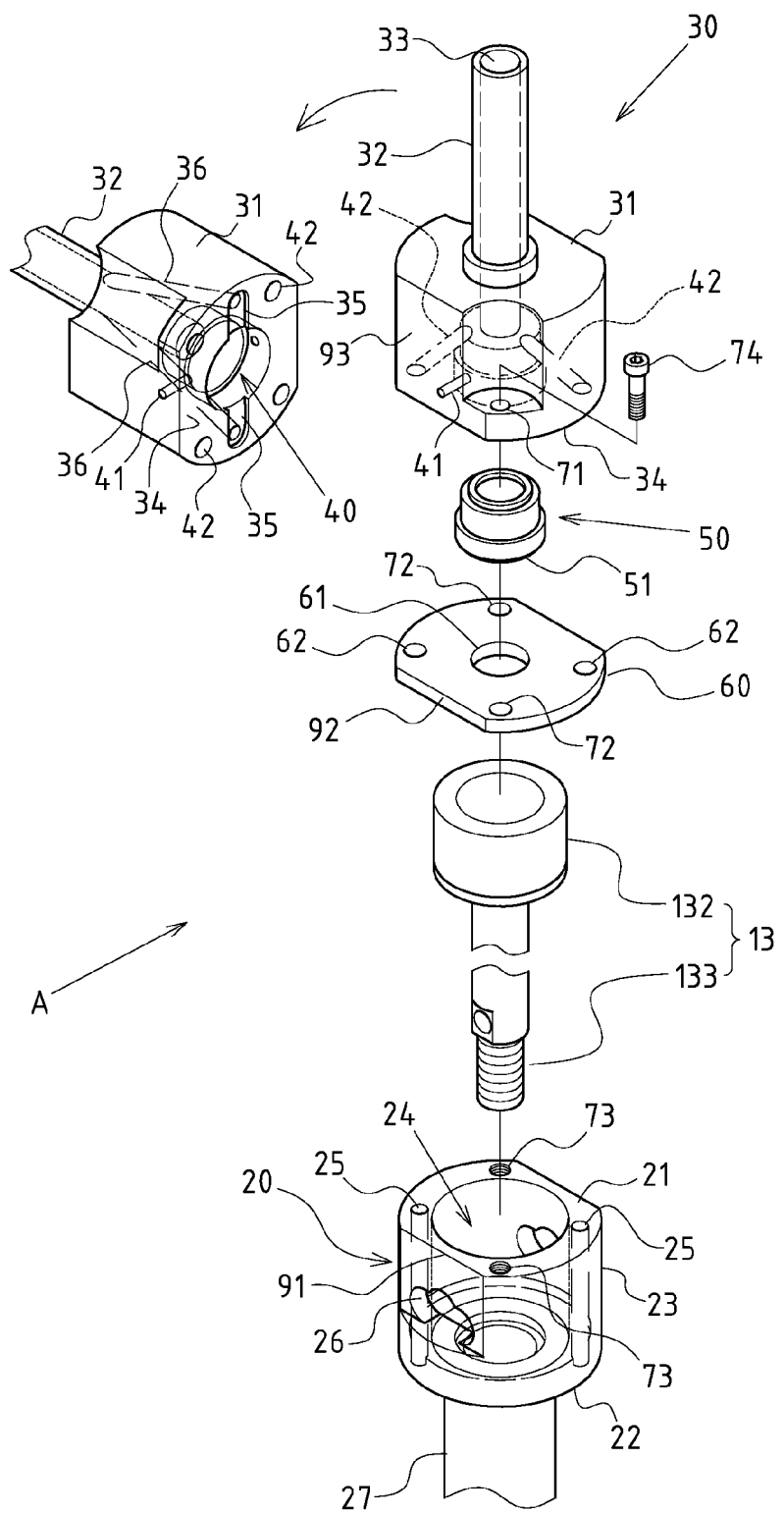
FIG. 3 is an exploded perspective view of the integrated module of cylinder and reversing assembly of the present invention.

Referring to FIG. 3, a plurality of bolt holes 71, 72 are set correspondingly on the air pressure guiding seat 30 and partition board 60. A positioning threaded hole 73 is set correspondingly to the inner assembly end 21 of the cylinder body 20, such that the bolt holes 71, 72 are fixed by the bolt 74 and locked into the positioning threaded hole 73, enabling secure assembly of the air pressure guiding seat 30, partition board 60 and cylinder body 20.

Figure 5:
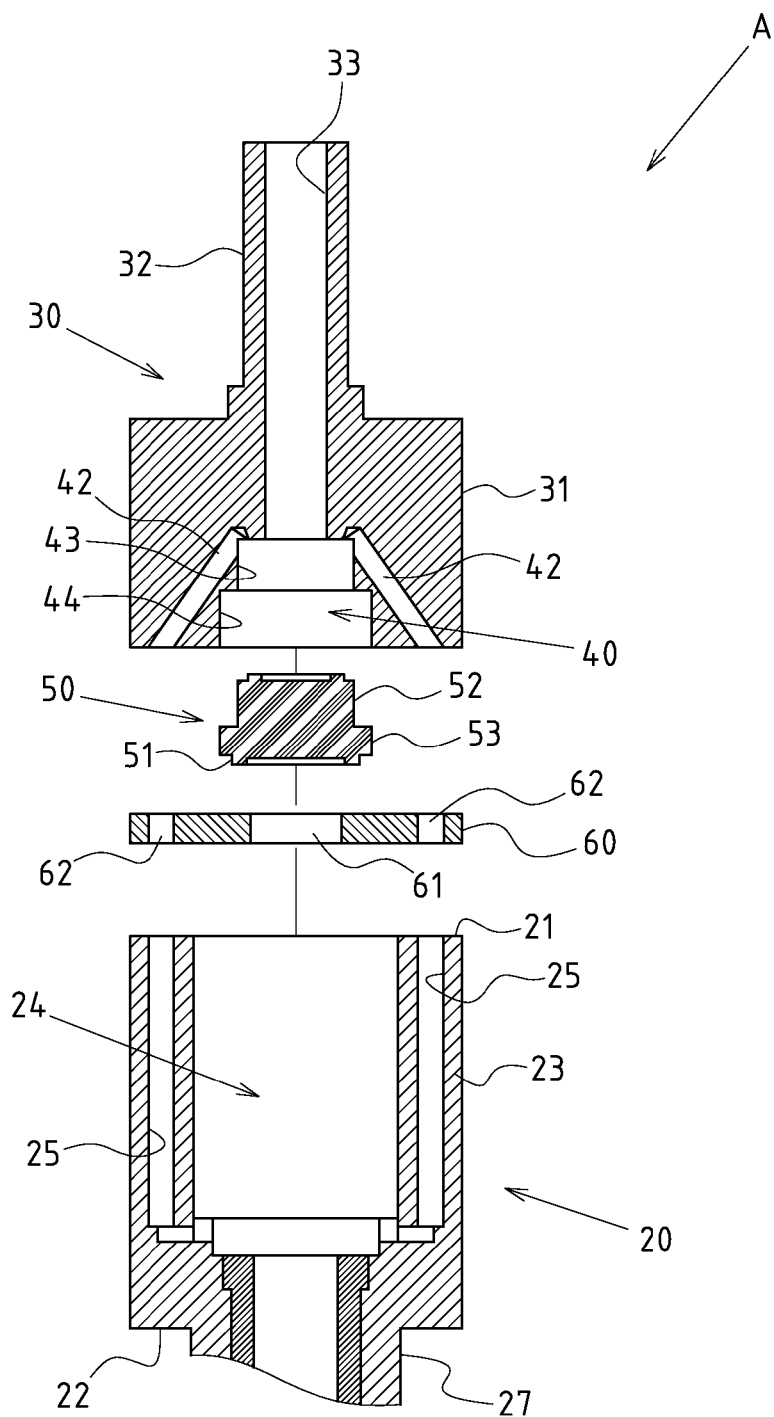
FIG. 5 is an exploded sectional view of the integrated module of cylinder and reversing assembly of the present invention.

Referring to FIG. 5, the reversible actuating slot 40 of a stepped recess space is defined into a pinched portion 43 and an flared portion 44, so that said lateral through-hole 41 is set correspondingly to the flared portion 44. The reversing brake block 50 comprises of a reduced portion 52 and an expanded portion 53. The expanded portion 53 is placed correspondingly to the pinched portion 43 of the reversible actuating slot 40, whilst the reduced portion 52 is mated with the flared portion 44 of the reversible actuating slot 40. With the design of a stepped pattern, a differential pressure area of bigger top and smaller bottom is formed in response to the actuating flow path design of the reversing brake block 50 (namely, the top is subject to central pressure, and the bottom subject to central and lateral pressure).

Figure 2:
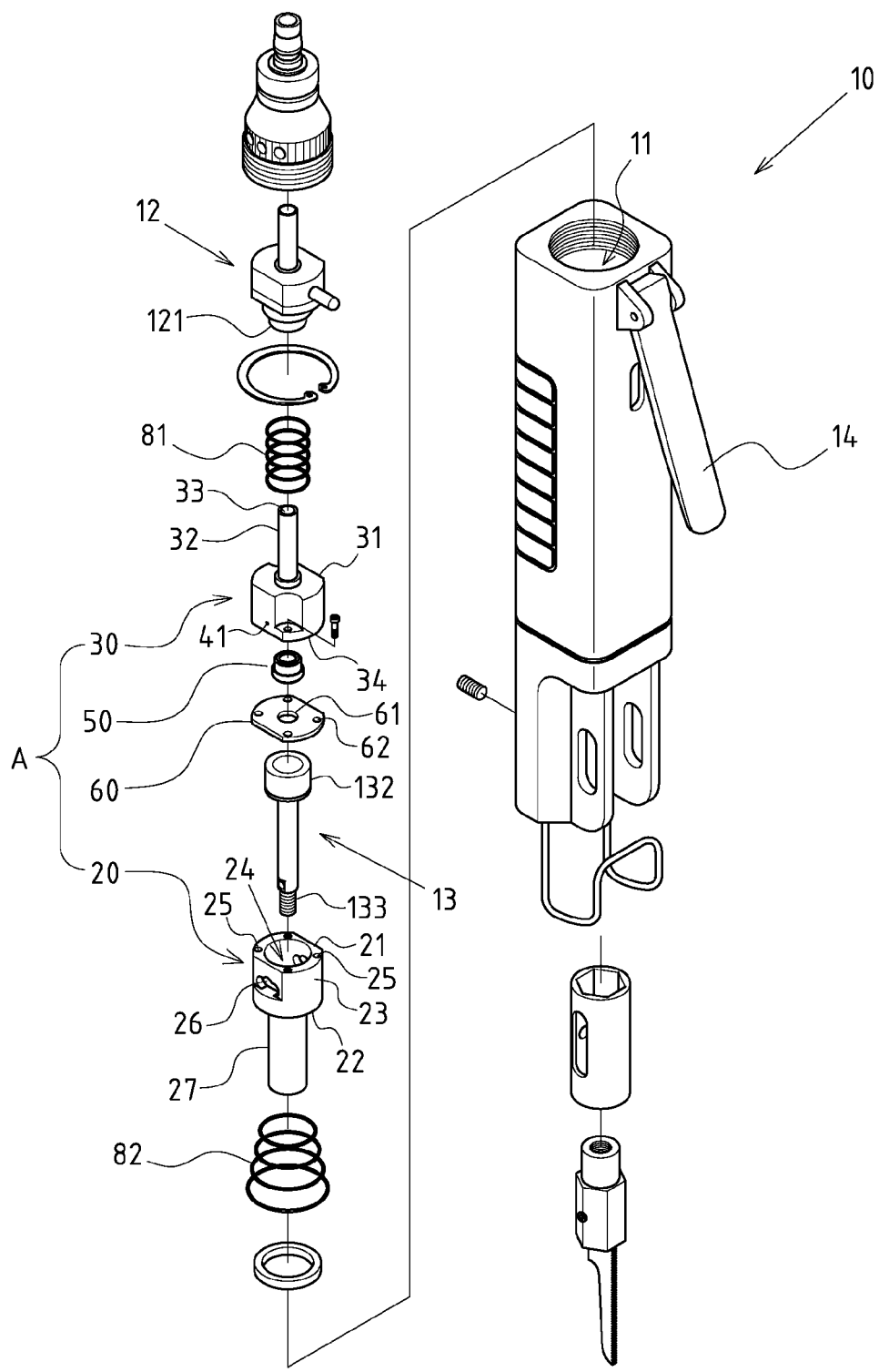
FIG. 2 is an exploded perspective view of the reciprocating pneumatic tool of the present invention.
Figure 4:
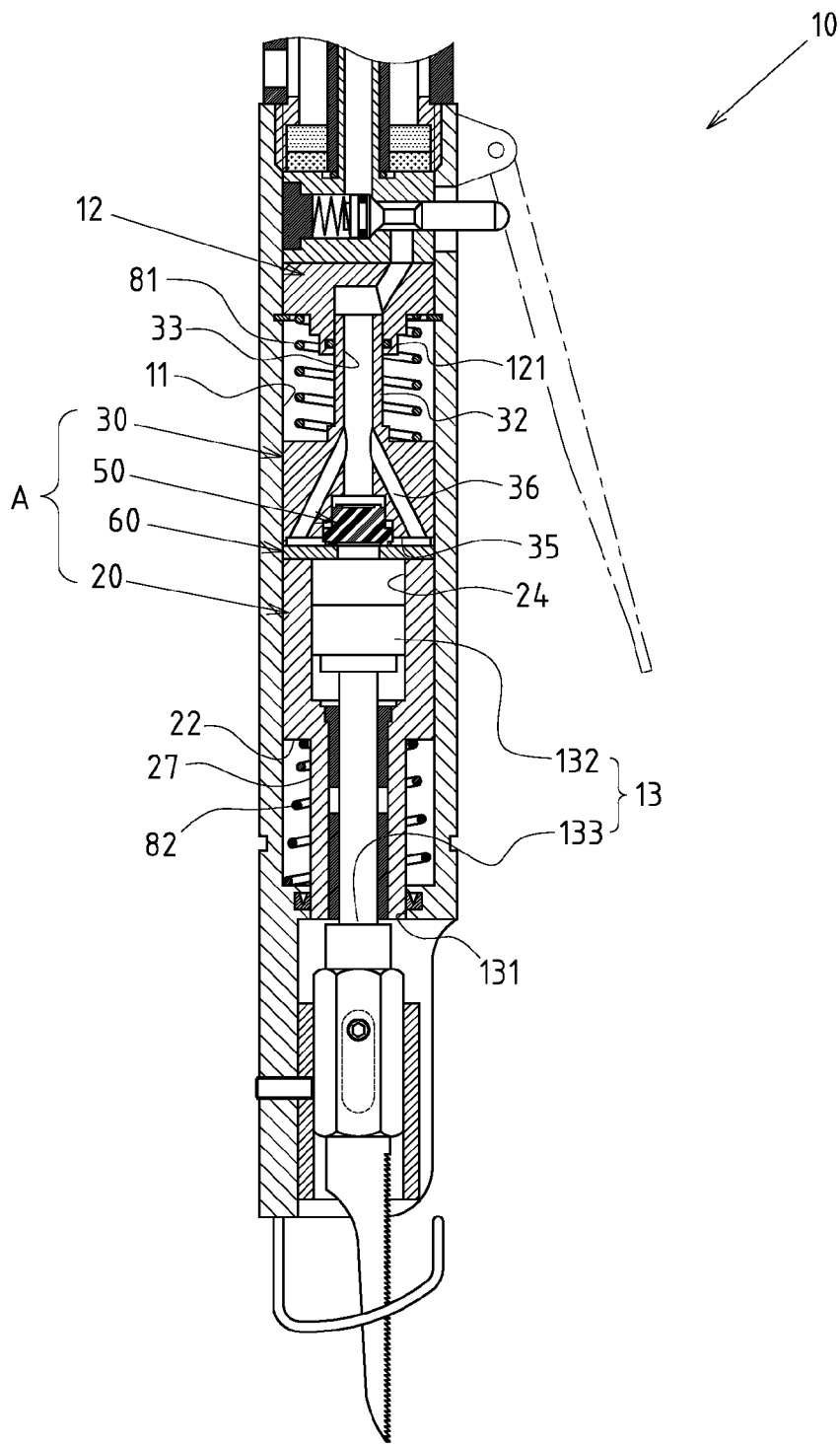
FIG. 4 is an assembled sectional view of the reciprocating pneumatic tool of the present invention.

Referring to FIGS. 2 and 4, a damper is arranged within the groove 11 of the reciprocating pneumatic tool 10. Said damper comprises of a central buffer 81 (e.g. a spiral spring) set between the seat body 31 of air pressure guiding seat 30 and air supply end 121 of air pressure control module 12, as well as a front buffer 82 (e.g. a spiral spring) set between the external end 22 of the cylinder body 20 and an end wall of the groove 11.

Figure 11:
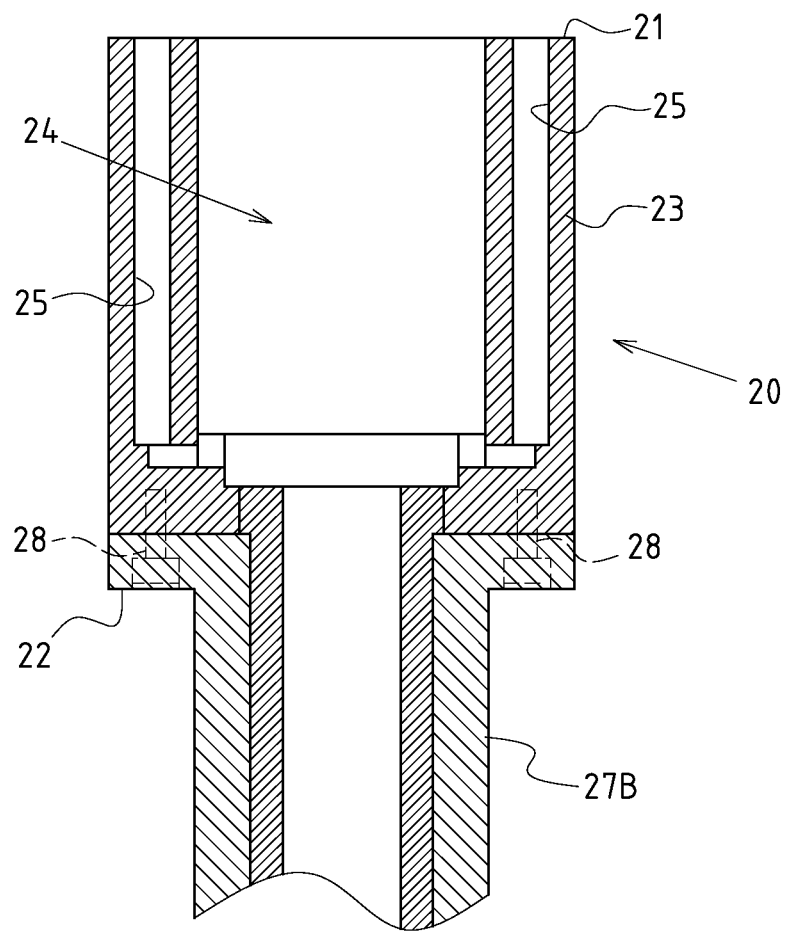
FIG. 11 is an application view wherein the piston rod guiding tube and cylinder body are assembled fixedly.

Of which, the piston rod guiding tube 27 on the external end 22 of the cylinder body 20 and the cylinder body 20 may be prefabricated (shown in FIGS. 2-9), or the piston rod guiding tube 27B shown in FIG. 11 is set into an assembled positioning structure, wherein the piston rod guiding tube 27B and the external end 22 of the cylinder body 20 can be fixed securely by bolt 28.

Moreover, the cylinder body 20, air pressure guiding seat 30 and partition board 60 are provided with trimmed edges 91, 92, 93. The inner wall opposite to the groove 11 of the reciprocating pneumatic tool 10 is of cylindrical cross section, such that an exhaust passage 94 is formed between the trimmed edges 91, 92, 93 and the inner wall of cylindrical groove 11 (shown in FIGS. 9 and 10).

Figure 6:
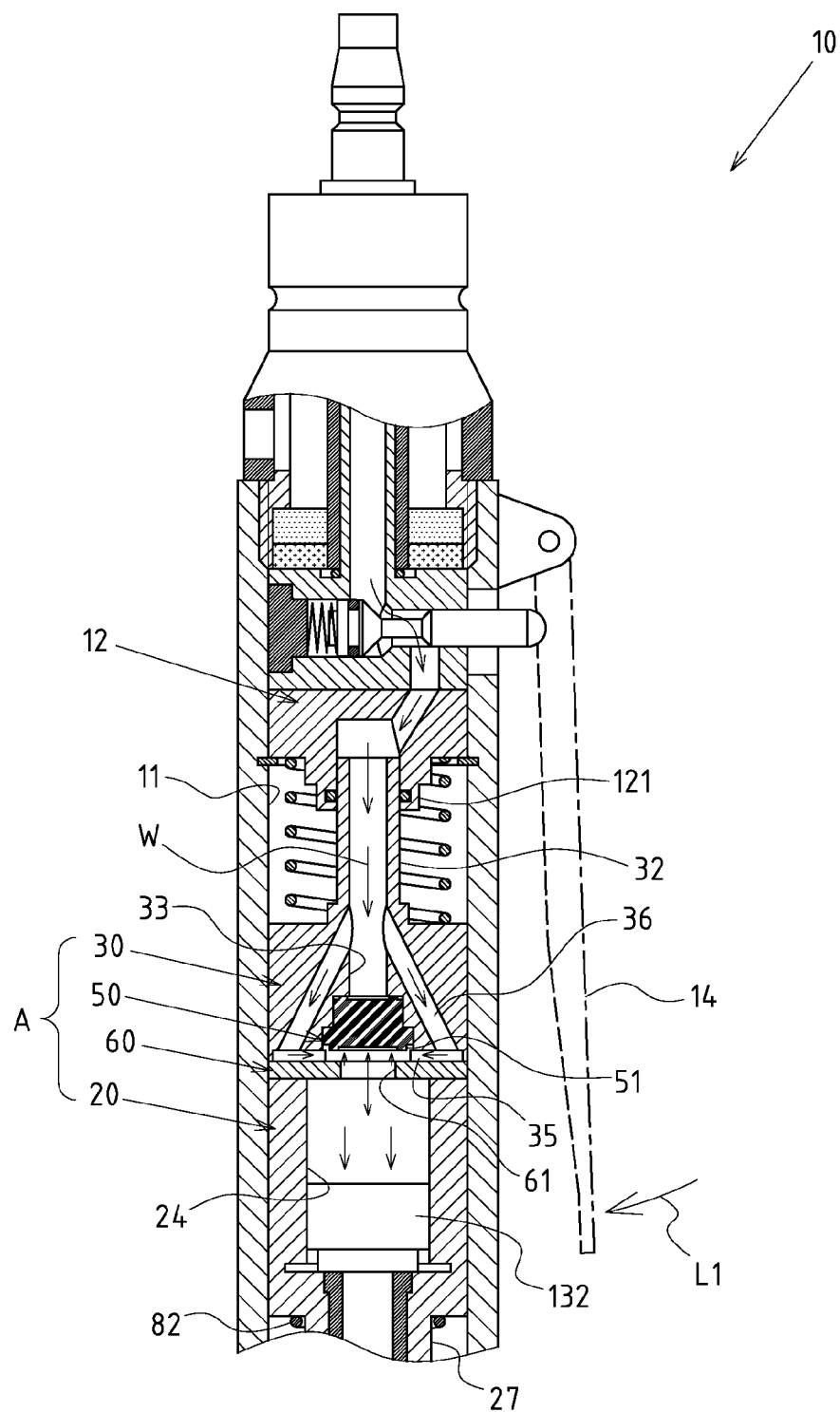
FIG. 6 is an air inlet schematic view 1 of the present invention.

Based upon above-specified structure, the present invention is operated as follows:

Referring to FIG. 6, said reciprocating pneumatic tool 10 is operated in such a manner that the control switch 14 is pressed (shown by arrow L1) to open air flow path of the air pressure control module 12. Then air pressure W will pass through air supply end 121 of air pressure control module 12 and air inlet end 32 into air pressure guiding seat 30 and integrated module A of cylinder and reversing assembly. With the help of air flow path design of the integrated module A, the piston 132 and piston rod 13 along with the actuating tool (e.g.: saw) are driven for rapid reciprocating movement with reference to the accompanying drawings.

Referring firstly to FIG. 6, when air pressure W is guided from air pressure guiding seat 30 into the integrated module A of cylinder and reversing assembly, it will pass through the oblique secondary air inlet guide hole 36 and flow duct 35 into the reversible actuating slot 40. In such a case, air pressure W will push the reversing brake block 50 upwards to drive the top of the reversing brake block 50 to close the main air inlet guide hole 33, on the other hand, air pressure W passes the through-hole 61 on the center of partition board 60 into the chamber 24 of the cylinder body 20 so as to push the piston 131 downwards.

Figure 7:
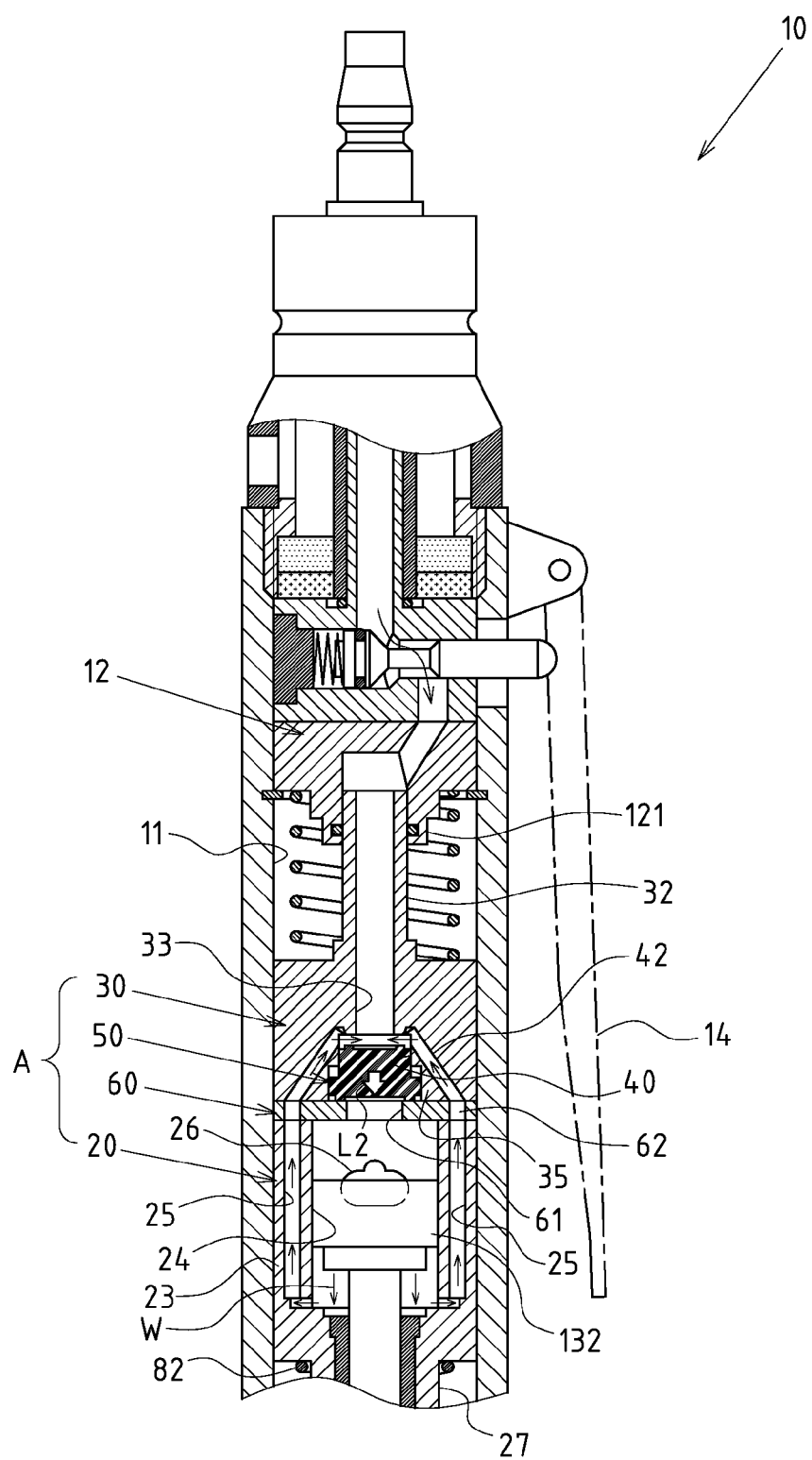
FIG. 7 is an air inlet schematic view 2 of the present invention.

Referring also to FIG. 7, the sectional position is located at the air flow duct 25 of the cylinder body 20. When the piston 132 is pushed downwards, air squeezed in the lower space of the chamber 24 will pass through air flow duct 25 on the cylinder wall 23 of the cylinder body 20, then through the flow through 62 of the partition board 60 and the oblique through-hole 42 of the air pressure guiding seat 30 into the upper part of the reversible actuating slot 40, thus pushing the reversing brake block 50 downwards (shown by arrow L2).

Figure 8:
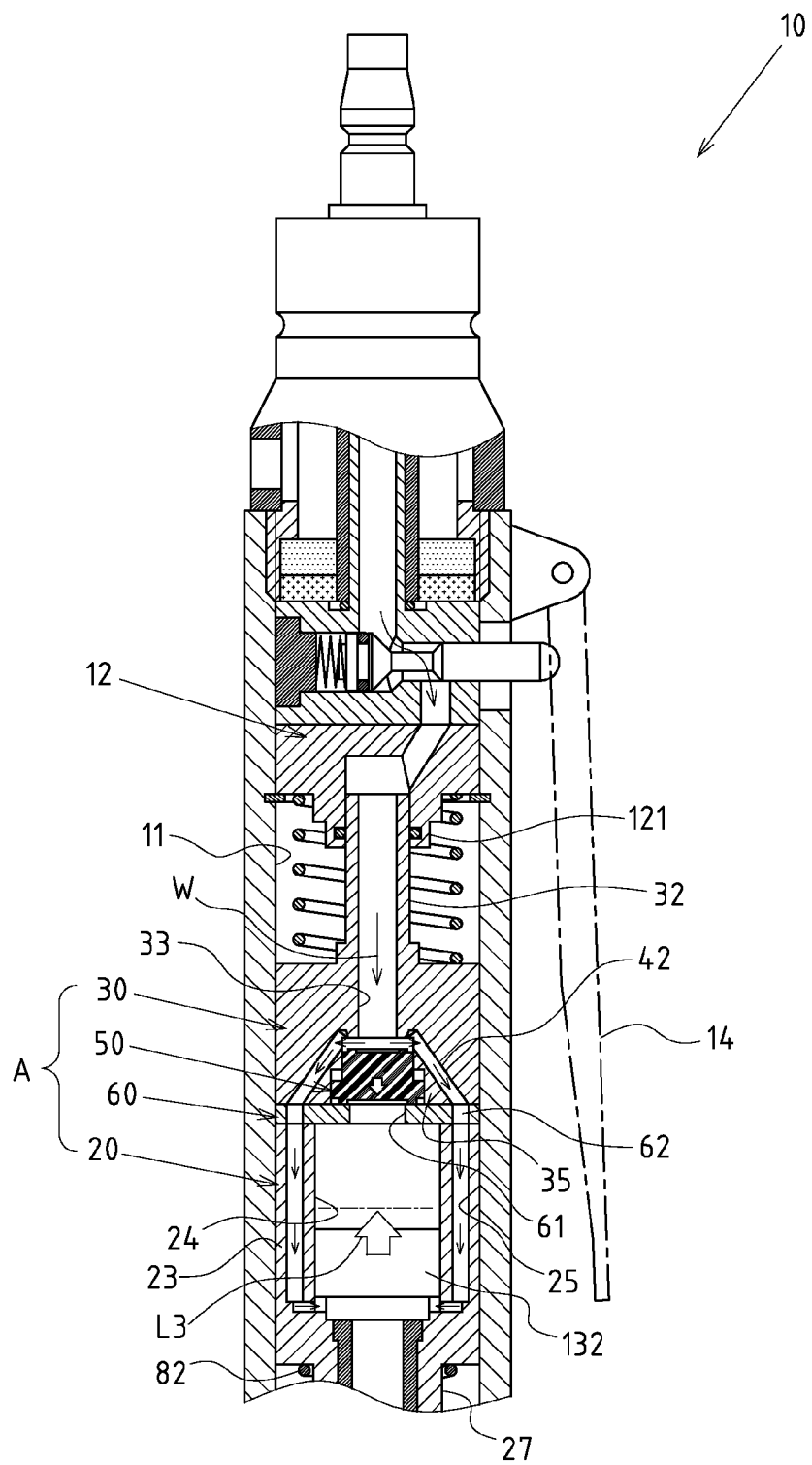
FIG. 8 is air inlet schematic view 3 of the present invention.

Referring also to FIG. 8, when the reversing brake block 50 is pushed downwards by air pressure W, air pressure W in main air inlet guide hole 33 can pass through oblique through-hole 42, then through the flow through 62 of partition board 60, air flow duct 25 of cylinder body 20 into the lower space of the chamber 24, thus pushing the piston 132 upwards (shown by arrow L3) for reversing movement.

Referring also to FIGS. 9 and 10, when the piston 132 is pushed to the bottom, exhaust air flow W2 will be discharged from air vent 26 on the chamber 24 to the exhaust passage 94 reserved on the cylinder body 20.

The core design of the present invention lies in that, the reversible actuating slot 40 of the integrated module A is recessed integrally onto the air pressure guiding seat 30, which is separated from the cylinder body 20 via said partition board 60, thus simplifying the structural members and facilitating fabrication without changing the functions of guiding, reversing air and actuating the piston.

I claim:

1. An integrated module of a cylinder and reversing assembly of a reciprocating pneumatic tool, wherein the integrated module is arranged between an air supply end of an air pressure control module and a guide outlet of piston rod in a groove of the reciprocating pneumatic tool, the piston rod is provided with a piston and a tool assembly portion, the integrated module of the cylinder and reversing assembly comprising:
    a cylinder body having a hollow body shaping an inner assembly end, an external end, a cylinder wall and a chamber, wherein said chamber accommodates the piston of the piston rod, wherein several air flow ducts are set internally on said cylinder wall, wherein air vents are opened laterally onto opposite sides of the cylinder wall, and wherein a reducing piston rod guiding tube is protruded on the external end;
    an air pressure guiding seat having a seat body and an air inlet end, a main air inlet guide hole of said air pressure guiding seat penetrates into said air inlet end and is connected with the air supply end of the air pressure control module, the seat body has an assembly end surface, flow ducts are set onto opposite sides of the assembly end surface, said flow ducts are each connected obliquely with the main inlet guide hole via a secondary air inlet guide hole;
    a reversible actuating slot recessed into the assembly end surface of the seat body, an inner end of said reversible actuating slot is connected with the main air inlet guide hole, a lateral through-hole set on the reversible actuating slot runs through the side wall of the seat body, a pair of oblique through-holes are formed on opposite sides of the inner wall of the reversible actuating slot so as to open the assembly end surface of the seat body, two sides of the reversible actuating slot are connected with the flow duct on the assembly end surface;
    a reversing brake block accommodated movably into the reversible actuating slot, a reducing flange is formed onto one end of the reversing brake block correspondingly to the reversible actuating slot; and
    a partition board assembled fixedly between the assembly end surface on the seat body of the air pressure guiding seat and the inner assembly end of the cylinder body, a through-hole having a diameter smaller than an external diameter of the reversing brake block is set on the center of the partition board, two flow troughs are spaced onto the partition board and are connected with the air flow duct on the cylinder wall of the cylinder body and the pair of oblique through-holes on the seat body of the air pressure guiding seat.

2. The integrated module of claim 1, wherein a plurality of bolt holes are set correspondingly on the air pressure guiding seat and partition board, a positioning threaded hole is set correspondingly to the inner assembly end of the cylinder body such that the bolt holes are fixed by respective bolts and locked into the positioning threaded hole.

3. The integrated module of defined in claim 1, wherein the reversible actuating slot has a pinched portion and a flared portion, said lateral through-hole is set correspondingly to the flared portion, the reversing brake block comprises a reduced portion and an expanded portion, the expanded portion is placed correspondingly in the pinched portion of the reversible actuating slot, the reduced portion is mated with the flared portion of the reversible actuating slot.

4. The integrated module of defined in claim 1, wherein dampers are arranged within the groove of the reciprocating pneumatic tool, the dampers comprise a central buffer set between the seat body of air pressure guiding seat and the air supply end of the air pressure control module, and a front buffer set between the external end of the cylinder body and an end wall of the groove.

5. The integrated module of claim 1, wherein the piston rod guiding tube on the external end of the cylinder body and the cylinder body are prefabricated.

6. The integrated module of claim 1, wherein the cylinder body, the air pressure guiding seat and the partition board are provided with trimmed edges, forming an inner wall opposite to the groove of the reciprocating pneumatic tool of a cylindrical cross section such that an exhaust passage is formed between the trimmed edges and the inner wall of cylindrical groove.

* * * * *